United States Patent [19]

Ross

[11] 4,129,058

[45] Dec. 12, 1978

[54] MUSICAL INSTRUMENT TEACHING AID

[76] Inventor: Leah M. Ross, Rte. 1, Box 73, Sedgwick, Kans. 67135

[21] Appl. No.: 834,674

[22] Filed: Sep. 19, 1977

[51] Int. Cl.² .............................................. G10B 15/08
[52] U.S. Cl. ................................................ 84/485 R
[58] Field of Search ................. 84/453, 465, 470, 476, 84/477, 485

[56] References Cited

U.S. PATENT DOCUMENTS

| 1,509,320 | 9/1924 | Schneider | 84/485 |
| 1,751,048 | 3/1930 | Miessner | 84/485 |
| 2,501,919 | 3/1950 | Saam | 84/465 |
| 3,153,970 | 10/1964 | Mulchi | 84/485 |
| 3,218,904 | 11/1965 | Hartman | 84/485 |
| 3,403,590 | 10/1968 | Quinton | 84/485 X |

FOREIGN PATENT DOCUMENTS 1395244  5/1975  United Kingdom ...................... 84/485

Primary Examiner—Lawrence R. Franklin
Attorney, Agent, or Firm—John H. Widdowson

[57] ABSTRACT

A musical instrument teaching aid for teaching the fingerings of a recorder. The teaching aid providing a plurality of dowels each having depressions therein for representing the fingering of only one particular musical note played on the recorder.

5 Claims, 6 Drawing Figures

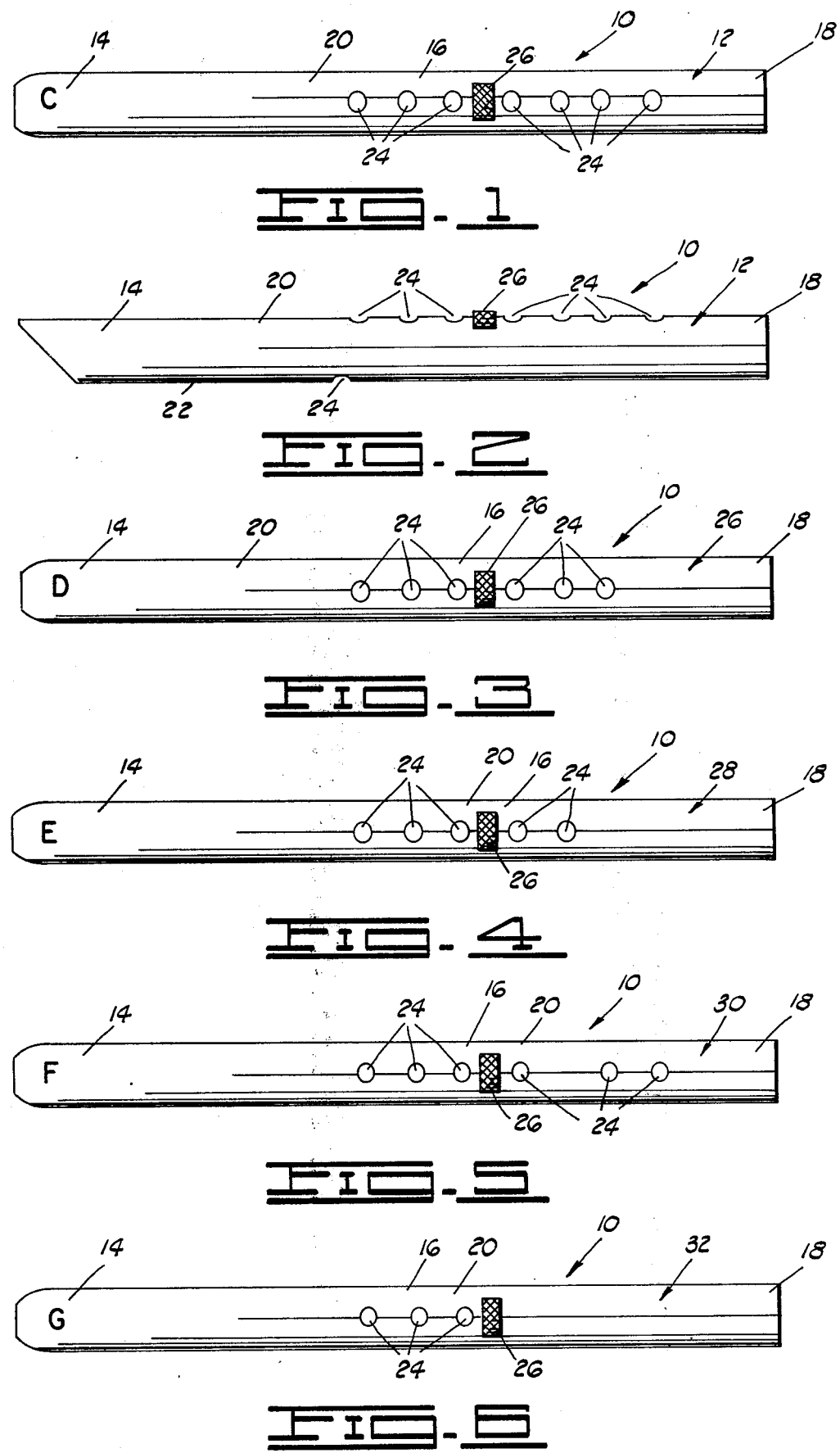

4,129,058

MUSICAL INSTRUMENT TEACHING AID

BACKGROUND OF THE INVENTION

This invention relates generally to a musical instrument teaching aid and more particularly, but not by way of limitation, to the teaching of the fingerings of a musical instrument known as a recorder.

Heretofore there have been various types of finger exercising devices having grooves therein, cord finders for string instruments, and practice finger boards for teaching the proper finger positions for a violin or the like. None of the prior art exercise and teaching devices disclose a teaching aid for teaching the fingerings of a recorder.

SUMMARY OF THE INVENTION

The subject invention provides a teaching aid for teaching the fingerings of the musical instrument known as the recorder. The teaching aid includes a set of dowels which represent each fingering of a particular note played on the recorder.

The set of dowels may be used for teaching a soprano recorder in the key of C, Baroque style, alto, and tenor recorders as well as other similar small cylindrical instruments using the same finger placements as the recorder.

The individual dowels provide the fingering for each note on the musical scale for quickly teaching a student of the recorder the proper fingering of that note.

Each individual dowel may be marked with indicia indicating the note represented thereby, for example, the letter of the note and/or its musical notation. Also, braille labels may be used for students who are blind.

The invention is simple in design, inexpensive and provides a method for quickly teaching the musical notes of the recorder.

The teaching aid includes a plurality of dowels having a beveled end which represents the mouthpiece of the recorder. Along the top of the dowels are a series of depressions disposed in a spaced relationship to each other and representing the fingering of the left and right hand for a particular musical note. A depression is on the bottom of the dowels and is used for indicating the placement of the left thumb. A textured piece of material which may be made of sandpaper, velour, or the like, is disposed between the depressions for the right hand and the left hand so that the right hand and left hand can quickly be placed in their proper position on top of the dowel.

The advantages and objects of the invention will become evident from the following detailed description when read in conjunction with the accompanying drawings which illustrate the preferred embodiments of the invention.

BRIEF DESCRIPTION OF THE DRAWINGS

FIG. 1 is a top view of the dowel representing the finger placement for the musical note middle C.

FIG. 2 is a side view of the dowel shown in FIG. 1.

FIG. 3 is a top view of the dowel representing the finger placement for the musical note D.

FIG. 4 is a top view of a dowel representing the finger placement for the musical note E.

FIG. 5 is a top view of a dowel representing the finger placement for the musical note F.

FIG. 6 is a top view of a dowel representing the finger placement for the musical note G.

DETAILED DESCRIPTION OF THE DRAWINGS

In FIG. 1, the musical instrument teaching aid for teaching the fingerings of a recorder is designated by general reference numeral 10. The teaching aid 10 includes an elongated dowel 12. The dimensions of the dowel 12 are approximately the same as a musical recorder. The dowel 12 includes a beveled first end portion 14, a center portion 16, and a second end portion 18. The end of the second end portion 18 is at right angles to the length of the dowel 12. The beveled first end portion 14 is beveled at a 45 degree angle and is used to represent the mouthpiece of the recorder. The dowel 12 further includes a top portion 20 and a bottom portion 22 shown in FIG. 2.

In the top portion 20 of the dowel 12 are disposed a plurality of depressions 24. The first three depressions 24 from left to right indicate the fingerings for the left hand. The remaining four depressions 24 represent the fingerings for the right hand. The depressions 24 of the left hand are divided from the depressions 24 of the right hand by a textured piece of material 26. The material 26 may be made of sandpaper, velour, or any other type of material which may be felt by the hands and used to aid in quickly positioning the right hand from the left hand on top of the dowel 12.

In FIG. 2, a side view of the dowel 12 is illustrated. In this view, a depression 24 can be seen in the bottom 22 of the dowel 12. The bottom depression 24 represents the position for the left thumb. When the fingers of the left hand and the right hand cover the depressions 24 shown in FIG. 1 and FIG. 2, the proper fingering for middle C is depicted as it would be played on a recorder. The note indicating indicia (C in FIG. 1 and D, E, F, G in FIGS. 3-6, respectively) are shown marked adjacent the mouthpiece; of course, any convenient location providing ease of reading may be used.

In FIG. 3, the teaching aid 10 is shown having a second dowel 26 having three depressions 24 from left to right for the left hand and three remaining depressions 24 for the right hand. Dowel 26 represents the fingerings for the musical note D. Again, the textured piece of material divides the depressions 24 for the left hand and the right hand.

In FIG. 4, a third dowel 28 is illustrated representing the fingerings for the musical note E. In this illustration, there are three depressions 24 from left to right for the left hand with the remaining two depressions for the right hand.

In FIG. 5 a fourth dowel 30 is illustrated and represents the fingerings for the musical note F. In this illustration, it should be noted that the depressions 24 for the right hand are not equally spaced one from the other and again represent the proper fingering placements for the musical note F.

In FIG. 6, a fifth dowel 32 is represented for the musical note G. In this illustration there are three depressions 24 for the left hand with no depressions for the right hand.

While the above figures illustrate the proper fingering placement for the musical notes middle C, D, E, F, and G, it should be appreciated that additional dowels are provided for the basic set of musical notes along with an expanded set of notes. The basic set of the musical teaching aid 10 would normally include nine dowels which would model the fingerings of middle C, D, E, F, G, A, B, C, and D, in ascending order. An expanded set would include F sharp, B♭, and C sharp in addition to the basic set. When the twelve fingerings of the basic set and expanded set are mastered, the remaining fingerings may be provided on additional dowels or may be taught verbally on the recorder itself.

The general concept of the teaching aid 10 can be extended to recorders of additional sizes and in keys other than the key of C. Although the recorder instrument is typically sectioned so that it can be taken apart, the teaching aid 10 for the soprano recorder in the key of C is made of one piece of dowel stock.

Changes may be made in the construction and arrangement of the parts or elements of the embodiment as disclosed herein without departing from the spirit or scope of the invention as defined in the following claims.

I claim:

1. A musical instrument teaching aid for teaching the fingerings of a recorder, the teaching aid comprising:
    a dowel having the approximate dimensions of a recorder, one end of said dowel being beveled to depict the mouthpiece of said recorder, thereby defining top and bottom portions of said dowel;
    a plurality of depressions in said top and bottom portions, said depressions being disposed along the length of said dowel in substantially the same locations as the corresponding holes in said recorder, said depressions being of such number and locations to indicate which of said recorder's holes must be covered by the player's fingers to play only one particular note playable by said recorder; and
    indicia marked on said dowel to indicate said one particular note.

2. The teaching aid as described in claim 1, further including a piece of textured material attached to the top of said dowel and disposed between the depressions for the right hand and the left hand.

3. The teaching aid of claim 1 wherein said bevel is at an approximate 45° angle from the top of the dowel to the bottom of the dowel.

4. The teaching aid of claim 1, wherein the indicia is the letter name of said one particular note.

5. The teaching aid of claim 1 further including a plurality of dowels, each of which have a different set of depressions to represent the fingerings of a different note; and
    a different indicia marked on each said dowel corresponding to said different note.

* * * * *